United States Patent
Alvarez Garcia et al.

(10) Patent No.: US 7,446,653 B2
(45) Date of Patent: Nov. 4, 2008

(54) LIGHTING AND/OR INDICATING SYSTEM FOR A VEHICLE, WITH IMPROVED ACTUATOR CONTROL

(75) Inventors: Daniel Alvarez Garcia, Bobigny (FR); Pascal Poirot, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 212 days.

(21) Appl. No.: 11/339,244

(22) Filed: Jan. 24, 2006

(65) Prior Publication Data
US 2006/0181888 A1   Aug. 17, 2006

(30) Foreign Application Priority Data
Jan. 28, 2005   (FR) .................................. 05 00903

(51) Int. Cl.
*B60Q 1/26* (2006.01)
(52) U.S. Cl. ............... 340/468; 307/10.8; 362/466; 362/460; 362/464
(58) Field of Classification Search ................. 340/468; 307/10.8; 362/466, 460, 464, 465, 467
See application file for complete search history.

(56) References Cited

U.S. PATENT DOCUMENTS

| | | | |
|---|---|---|---|
| 6,010,237 A * | 1/2000 | Gotou ........................ 362/460 |
| 6,357,898 B1 | 3/2002 | Toda et al. ................... 362/466 |
| 7,234,849 B2 * | 6/2007 | Hori et al. .................... 362/466 |
| 7,239,951 B2 * | 7/2007 | Sugimoto et al. ............. 701/49 |
| 7,241,034 B2 * | 7/2007 | Smith et al. .................. 362/465 |
| 2001/0019225 A1 | 9/2001 | Toda et al. .................. 307/10.8 |

FOREIGN PATENT DOCUMENTS

DE      43 11 669      10/1994

OTHER PUBLICATIONS

Search Report for corresponding FR 05 00 903 dated Nov. 15, 2005.
DIALOG English language Abstract for DE 43 11 669, Jan. 23, 2006.

* cited by examiner

*Primary Examiner*—George A Bugg
*Assistant Examiner*—Travis R Hunnings
(74) *Attorney, Agent, or Firm*—Morgan & Finnegan LLP

(57) ABSTRACT

The lighting and/or signaling system according to the invention comprises at least one lighting and/or signaling device which is able to emit at least one light beam and is equipped with at least one actuator for adjusting an angle of the light beam, and at least one actuator control device for controlling the actuator. According to the invention, the actuator control device transmits an active setpoint information item to the actuator only when a current value of the setpoint information item differs substantially from a previous value of the setpoint information item. The improved actuator control incorporated in the system according to the invention helps to achieve greater reliability and a longer service life.

10 Claims, 2 Drawing Sheets

LIGHTING AND/OR INDICATING SYSTEM FOR A VEHICLE, WITH IMPROVED ACTUATOR CONTROL

FIELD OF INVENTION

The invention relates in general to the field of lighting/signaling systems for vehicles, in particular motor vehicles. More particularly, the invention relates to a lighting and/or signaling system for a vehicle, comprising at least one lighting and/or signaling device which is able to emit a light beam and is equipped with at least one actuator for adjusting an angle of the light beam, and at least one actuator control device.

BACKGROUND OF THE INVENTION

The invention finds application in particular, but not exclusively, in lighting and/or signaling systems which include actuators provided for adjusting the tilt angle of the headlamps as a function of attitude variations of the vehicle.

Actuators 1D and 1G of the type mentioned above are shown schematically in FIG. 1A which shows a first type of actuator control device according to the known prior art of the inventive entity. The device shown in FIG. 1A is designed for manual correction of the tilt angle of the headlamps, by means of a potentiometer which is accessible to the driver of the vehicle.

The actuators 1D and 1G respectively equip the right and left headlamps of the motor vehicle.

As shown in FIG. 1A, the actuator 1D, 1G comprises a DC motor 10, a motion conversion mechanism 11 and a motor control circuit 12.

The motion conversion mechanism 11 is for example of the wheel/worm or wheel/rack type. The rotation of the motor 10 gives rise to a linear movement of a control rod 110 which is mechanically coupled to the headlamp, so as to adjust the tilt angle of the latter.

In this type of device, the position of the rod is determined by the value of a DC setpoint voltage Vc which is applied to an input of the motor control circuit 12. The setpoint voltage Vc is processed by the motor control circuit 12 so as to shape a drive signal adapted to the motor.

The control voltage Vc is obtained by means of an adjustment potentiometer 2 which is supplied by a DC voltage Vcode. In a conventional manner, the DC voltage Vcode is present when the lighting control stalk switch is positioned at "low beam" or "full beam" by the driver of the vehicle. The voltage Vcode is also used as a supply voltage for the actuators 1D and 1G.

In this first type of actuator control device according to the prior art, the setpoint voltage Vc is applied to the actuators 1D, 1G for the entire duration that the headlamps are set to "low beam" or "full beam", and its value is taken into account throughout this duration for controlling the actuators 1D, 1G. This means that fluctuations in the setpoint voltage Vc, due for example to parasitic electrical or electromagnetic signals, are continuously passed to the actuators 1D, 1G and give rise to undesirable displacements thereof.

These undesirable displacements of the actuators have negative repercussions on the service life thereof and may lead to tilt angle settings which do not comply with the regulations.

A second type of actuator control device according to the known prior art of the inventive entity is shown in FIG. 1B. The device shown is designed for automatic correction of the tilt angle of the headlamps.

In this second type of device, the actuators 1D and 1G are no longer controlled by a DC setpoint voltage but rather by a pulse control signal $Vc_{pwm}$ of the pulse width modulation type. The control signal $Vc_{pwm}$ is processed by a motor control circuit 12' which is able to shape a drive signal adapted to the motor. As in the device of FIG. 1A, the actuators 1D and 1G are supplied by the DC voltage Vcode.

In the device of FIG. 1B, the control signal $Vc_{pwm}$ is produced by a correction control circuit 3 on the basis of front 4AV and rear 4AR attitude sensors which are coupled for example to the axles of the vehicle. The correction control circuit 3 is supplied by the DC voltage Vcode.

On account of the pulse width modulation of the control signal $Vc_{pwm}$, this second type of device provides better resistance to electrical and electromagnetic parasites compared to the device of FIG. 1A. However, such a technical solution still does not make it possible to satisfy the increased requirements in terms of reliability and service life which apply to headlamps in the motor vehicle sector.

SUMMARY OF THE INVENTION

The present invention aims to overcome the aforementioned disadvantages of the prior art by providing a lighting and/or signaling system for a vehicle which incorporates improved actuator control designed for greater reliability and an increased service life.

The lighting and/or signaling system for a vehicle, in particular a motor vehicle, according to the invention comprises at least one lighting and/or signaling device which is able to emit at least one light beam and is equipped with at least one actuator for adjusting an angle of the light beam, and at least one actuator control device for controlling the actuator. According to the invention, the actuator control device comprises control means which are able to transmit an active setpoint information item to the actuator only when a current value of the setpoint information item differs substantially from a previous value of the setpoint information item.

According to another particular feature of the invention, the actuator control device also comprises switching means which are able to interrupt an electrical power supply to the actuator when no active setpoint information item is transmitted to the actuator by the control means.

Preferably, the switching means comprise a controllable switch. According to one particular embodiment, this controllable switch makes use of a transistor of the MOS type. According to another particular embodiment, this controllable switch makes use of a switch circuit of the SmartMOS type.

According to yet another particular feature, the control means comprise memory means for storing the previous value of the setpoint information item, and comparison means for comparing the current and previous values of the setpoint information item and ordering the transmission of the active setpoint information item to the actuator when a difference is detected between the current and previous values. Preferably, the comparison means are able to order the transmission of the active setpoint information item to the actuator when the detected difference is above a predetermined threshold.

According to one particular embodiment, the actuator control device is embodied at least partially by means of operational amplifiers.

According to another particular embodiment, the actuator control device is integrated at least partially in a controller of the system. Preferably, the actuator control device is implemented in the controller at least partially by means of program instructions.

According to one particular embodiment of the invention, the actuator comprises a DC motor.

Other aspects and advantages of the present invention will emerge more clearly from reading the following description of particular embodiments, this description being given by way of non-limiting example and with reference to the appended drawings, in which:

DESCRIPTION OF THE PREFERRED EMBODIMENTS

The invention will now be described essentially within the context of one particular embodiment of a system according to the invention in which actuators which are coupled to the headlamps are provided for adjusting the tilt angle of said headlamps.

Figure 2:
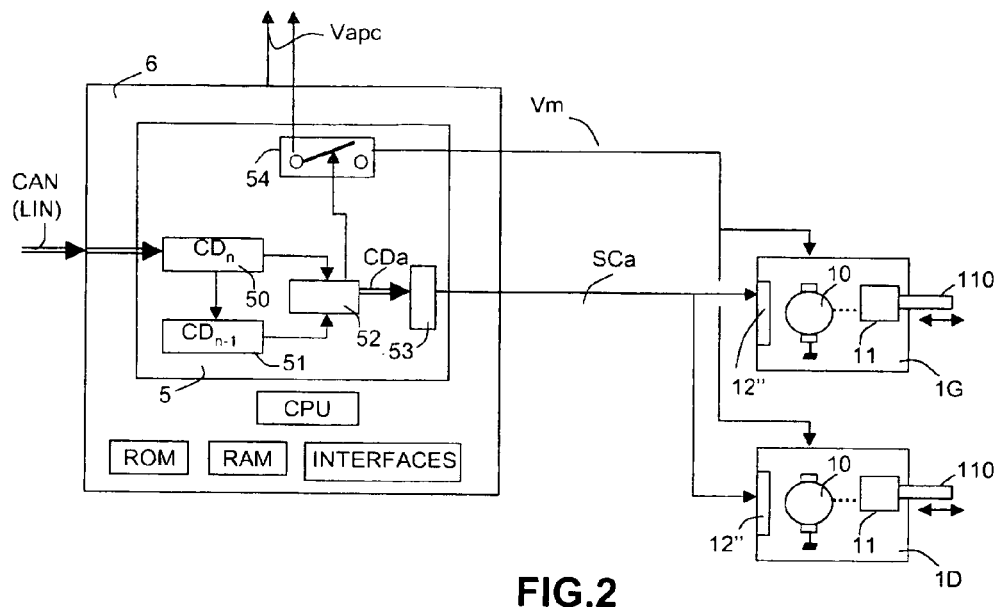
FIG. 2 schematically shows the actuator control means included in a lighting and/or signaling system according to the invention.

As shown in FIG. 2, the actuator control device according to the invention, which is denoted as a whole by reference 5, is connected to the actuators 1D and 1G of the headlamps (not shown) and receives at the input a setpoint information item CD.

As will emerge more clearly below, the setpoint information item CD supplied to the actuator control device according to the invention may be in different forms, for example in the form of a DC voltage with a level which is representative of the setpoint information item CD, a pulse width modulated (PWM) signal, a digital data item or the like.

Figure 1A:
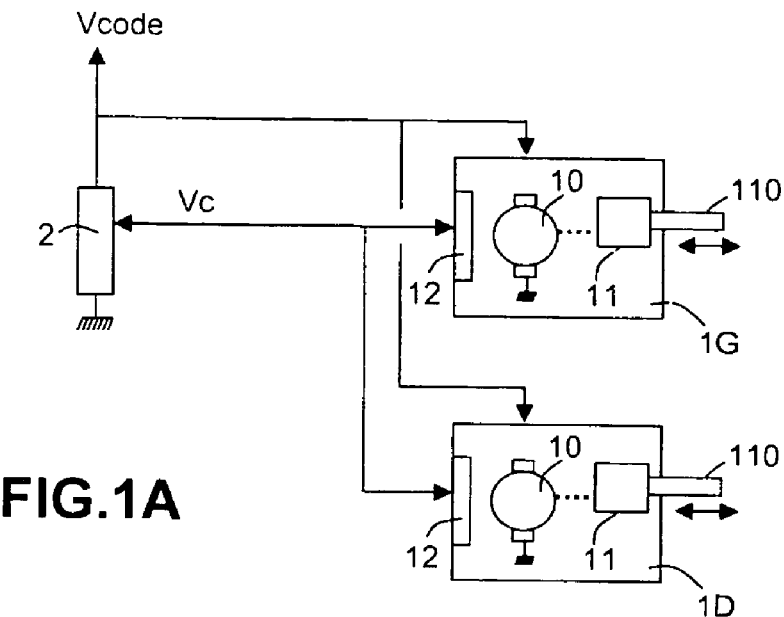
FIG. 1A shows a first type of actuator control according to the prior art.
Figure 1B:
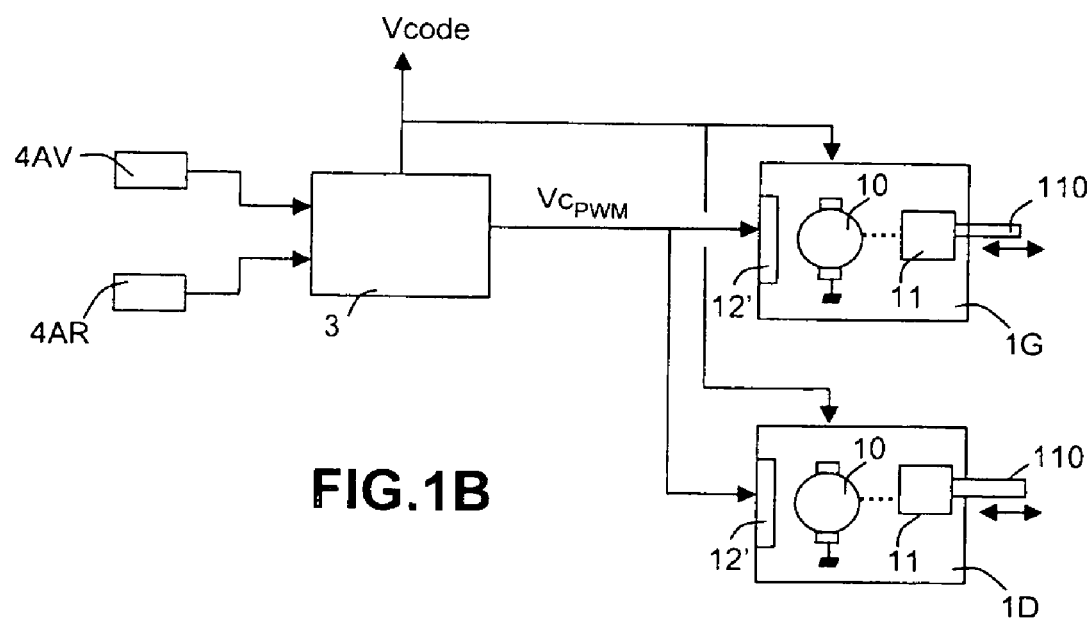
FIG. 1B shows a second type of actuator control according to the prior art.

In this embodiment, the actuators 1D and 1G are analogous to those described above with reference to FIGS. 1A and 1B, and thus will not be described again in detail here.

However, it will be noted that the invention applies both to actuators with direct control of the motor and to actuators with slaved control of the motor.

Moreover, the actuators 1D and 1G each comprise a motor control circuit 12" suitable for connection to the actuator control device 5 according to the invention.

The circuit 12" comprises means for receiving an actuator control transmission signal SCa provided by the device 5 and for supplying power to the motor 10 so as to obtain the tilt angle corresponding to the adjustment information item contained in the signal SCa.

The circuit 12" will not be described in any further detail here since its design is within the competence of the person skilled in the art enlightened by the teaching contained in the present application.

Advantageously, the device 5 according to the invention can be implemented essentially in software form in a controller 6 of the vehicle. In such a case, the controller 6 will comprise in particular a central processing unit CPU, read-only and random-access memories ROM and RAM, respectively, interfaces and various circuits and means for signal processing.

The actuator control device according to the invention may also be embodied in an essentially analogue form, for example by means of operational amplifiers, and this will be at a reduced cost.

As will emerge more clearly below, some circuits, means and interfaces of the controller 6 may be dedicated more particularly to the device 5 according to the invention and will comprise for example, as shown in FIG. 2, a pulse with modulator (PWM) 53 and a power switch 54. Of course, other types of circuit could be provided, such as for example a DC level generator when the actuator control transmission signal SCa is an analogue signal whose level forms the relevant information item for controlling the actuators.

In the embodiment of FIG. 2, the device 5 according to the invention comprises registers 50 and 51, a comparator 52, the PWM modulator 53 and the power switch 54. Of course, the functions of the elements 50, 51 and 52 may advantageously be implemented in the controller 6 by means of the RAM memory and program instructions which can be recognized by the central processing unit CPU so as in particular to execute read/write and comparison operations.

Still in this embodiment, the controller 6 is connected to a CAN or LIN bus of the vehicle, via which the device 5 according to the invention receives the setpoint information item CD which is intended for controlling the actuators 1D and 1G. In order not to unnecessarily overload FIG. 2, it is considered here that the various means necessary in the controller for managing communications with the CAN or LIN bus are included in the module denoted INTERFACES.

As a variant, the setpoint information item CD may not be received directly by the controller 6 as mentioned above but may rather be calculated by the latter from measurement information items which are transmitted via the CAN or LIN bus by vehicle attitude sensors.

According to another variant, the setpoint information item CD or the measurement information items from the attitude sensors may be supplied to the controller 6 in the form of DC voltages which are then digitalized by analogue/digital conversion means included in the microcontroller 6.

The mode of operation of the device 5 according to the invention will now be described with reference to the algorithm of FIG. 3.

Figure 3:
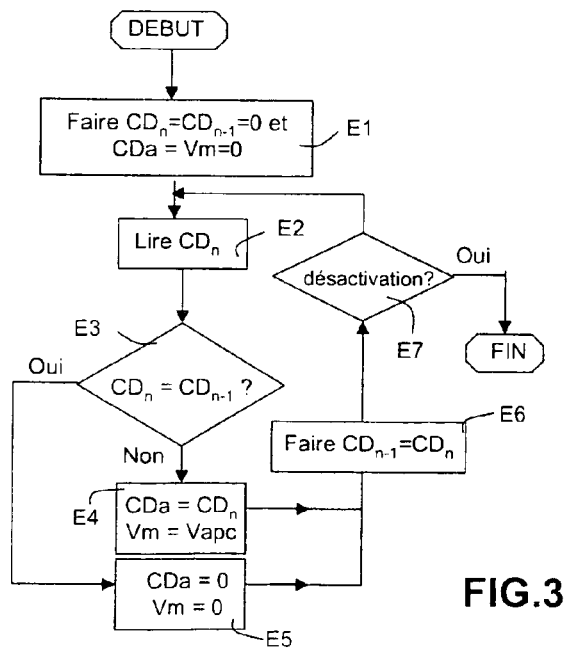
FIG. 3 is an algorithm showing the mode of operation of the actuator control means of FIG. 2.

The algorithm of FIG. 3 comprises steps E1 to E7.

In the device 5 according to the invention, the registers 50 and 51 shown in FIG. 2 are provided for storing values $CD_n$ and $CD_{n-1}$ of the setpoint information item CD, $CD_n$ being the current value of CD at a time n and $CD_{n-1}$ being the value of CD at a previous time n−1.

Activation of the device 5 according to the invention starts with the execution of step E1 during which the values $CD_n$ and $CD_{n-1}$ contained in the registers 50 and 51 are initialized to inactive values. In order to prevent needless displacements of the actuators, and also for safety reasons, an actuator control information item CDa and a supply voltage Vm are preferably also initialized to inactive values.

Steps E2 to E7 are carried out in each algorithm processing loop so as to determine, from the setpoint information item CD, the actuator control information item CDa to be transmitted to the actuators 1D and 1G.

In step E2, the current value $CD_n$ of the setpoint information item CD is read and stored in the register 50.

In step E3, the comparator 52 carries out a comparison between the current $CD_n$ and previous $CD_{n-1}$ values of the setpoint information item CD. The values $CD_n$ and $CD_{n-1}$ are read into the registers 50 and 51, respectively.

If the values $CD_n$ and $CD_{n-1}$ are found to be different in step E3, the comparator 52 delivers in step E4 an actuator control information item CDa having the value $CD_n$. The information item $CDa=CD_n$ is then transmitted to the actuators 1D and 1G by means of the actuator control transmission signal SCa, so as to bring about a displacement of the control rod 110 into a position corresponding to the value $CD_n$.

According to the invention, the signal SCa may be in various forms. In the preferred embodiment of FIG. 2, the signal SCa is pulse width modulated with the actuator control information item $CD_n$ by the PWM modulator 53.

If the values $CD_n$ and $CD_{n-1}$ are found to be equal in step E3, the comparator 52 delivers in step E5 an actuator control information item CDa having an inactive value, for example "0". The information item CDa=0 is then transmitted to the actuators 1D and 1G in the same way as that described above in respect of $CDa=CD_n$. The information item CDa=0 does not give rise to any rotation of the motors 10, and the control rods 110 thus remain in their position.

It should be noted here that the determination of the difference/equality carried out by the comparator 53 takes into account a given margin, and that the terms "different" and "equal" applied above to the values $CD_n$ and $CD_{n-1}$ should not be interpreted in a strict sense. In other words, according to one particular embodiment of the invention, the current value $CD_n$ is found to be different from the previous value $CD_{n-1}$ if the difference in absolute terms exceeds a certain threshold. Otherwise, the values $CD_n$ and $CD_{n-1}$ are found to be equal.

Still with reference to FIGS. 2 and 3, step E6 which is carried out after step E4 or E5 corresponds to storage of the current value $CD_n$ in the register 51. The value $CD_n$ stored in the register 51 thus becomes the value $CD_{n-1}$ taken into account in the following loop. Preferably this storage step E6 is carried out after a certain time-out period, so as to take account of the time taken for the actuators to reach the setpoint position.

Step E7 terminates execution of the algorithm and deactivates the device 5 according to the invention, for example when a lighting stop command is detected by the controller 6.

According to the invention, it is also possible to supply power to the actuators 1D and 1G only when the signal SCa carries an actuator control information item CDa with an active value, that is to say a value other than "0" in this example, which is able to give rise to a rotation of the motors 10. This functionality of the invention is implemented in the device 5 by means of the power switch 54.

In the embodiment of FIGS. 2 and 3, the power switch 54 consists for example of a transistor of the MOS type which is integrated in the controller 6. The switch 54 comprises a first terminal which is connected to a supply voltage Vapc and a second terminal which is connected to a wire of the electrical power supply of the vehicle so as to supply the actuators 1D and 1G with a supply voltage Vm.

The opening/closing of the switch 54 is controlled by the comparator 52.

When step E4 of the algorithm of FIG. 3 is carried out, the switch 54 is made to close and the supply voltage Vm=Vapc is supplied to the actuators 1D and 1G. The actuator control information item CDa transmitted to the actuators 1D and 1G is then active and the power supplied to said actuators permits the rotation of the motors 10.

When step E5 is carried out, the actuator control information item CDa transmitted to the actuators 1D and 1G is inactive, CDa=0, thus preventing any undesirable displacement of the actuators 1D and 1G.

Moreover, in step E5, as shown in FIG. 3, the switch 54 can be made to open and the supply voltage Vm=0 V is then supplied to the actuators 1D and 1G. This is because, when the actuators 1D and 1G are provided with an inactive information item CDa, maintaining the voltage Vm may be unnecessary in some embodiments. In such a case, the setting of the voltage Vm to 0 V provides an additional guarantee that the actuators 1D and 1G will not be displaced and may help to limit current consumption.

In this embodiment which incorporates the switch 54, the supply voltage Vapc may be the "after contact" voltage of the vehicle, that is to say a voltage which is present in the electrical power supply of the vehicle following actuation of the contact key by the driver. This is because the switch 54, by keeping the application of the voltage Vapc to the actuators to the strict minimum, makes it possible to better satisfy the requirements in terms of service life of the actuators without it being necessary to use the voltage Vcode of the vehicle. Besides the substantial improvement in terms of service life, the incorporation of the switch 54 may also have an impact on reducing the number of connecting wires which are necessary for the lighting device of the vehicle.

In another particular embodiment of the invention, the switch 54 may be in the form of a switch circuit of the SmartMOS type which is capable of performing intelligent functions such as, for example, detecting a fault in the electrical power supply wire or measuring the electrical current consumed. The SmartMOS switch circuit thus supplies the lighting and/or signaling system of the vehicle with information items which said system can advantageously use to perform its tasks.

Of course, the present invention is not restricted to the details regarding the modes of embodiment described here by way of example, but rather extends to the modifications made by those skilled in the art without departing from the scope of the invention.

Thus, for example, the actuator control device could in some applications be associated at the output with means for interfacing with a connection of the LIN type, so as to transmit the actuator control information item CDa to the actuator via this LIN connection.

Moreover, the person skilled in the art can use the present invention to control actuators other than those dedicated to adjusting the tilt angle of headlamps, for example, in some applications, those used in the "Dynamic Bending Light" (DBL) function.

What is claimed is:

1. A lighting and/or signaling system for a vehicle, in particular a motor vehicle, comprising:
   (a) at least one lighting and/or signaling device which may selectively emit at least one light beam;
   (b) at least one actuator for adjusting an angle of the light beam; and
   (c) at least one actuator control device for controlling the actuator wherein the actuator control device transmits an active setpoint information item to the actuator only when a current value of the setpoint information item differs substantially from a previous value of the setpoint information item, wherein the actuator control device further comprises a switching device which is able to interrupt an electrical power supply to the actuator when no active setpoint information item is transmitted to the actuator by the actuator control device.

2. The lighting and/or signaling system according to claim 1, wherein the switching device comprises a controllable switch such as a transistor of the MOS type.

3. The lighting and/or signaling system according to claim 1, wherein the switching device comprises a controllable switch such as a switch circuit of the SmartMOS type.

4. The lighting and/or signaling system according to claim 1, wherein the actuator control device comprises:
   (a) a register which stores the previous value of said setpoint information item; and
   (b) a comparator which compares the current and previous values of the setpoint information item and orders the transmission of the active setpoint information item to the actuator when a difference is detected between the current and previous values of the setpoint information item.

5. The lighting and/or signaling system according to claim 4, wherein the comparator orders the transmission of the active setpoint information item to the actuator when the detected difference is above a predetermined threshold.

6. The lighting and/or signaling system according to claim 1 wherein the actuator control device further comprises an interface for managing communications with a connection of the CAN or UN type.

7. The lighting and/or signaling system according to claim 1, wherein the actuator control device is embodied at least partially by operational amplifiers.

8. The lighting and/or signaling system according to claim 1, wherein the actuator control device is integrated at least partially in a controller of the system.

9. The lighting and/or signaling system according to claim 8, wherein the actuator control device is implemented in the controller at least partially by program instructions.

10. The lighting and/or signaling system according to claim 1, wherein the actuator comprises a DC motor.

* * * * *